US011152003B2

(12) United States Patent
O'Donovan

(10) Patent No.: US 11,152,003 B2
(45) Date of Patent: Oct. 19, 2021

(54) ROUTING VOICE COMMANDS TO VIRTUAL ASSISTANTS

(71) Applicant: International Business Machines Corporation, Armonk, NY (US)

(72) Inventor: Brian O'Donovan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 16/144,270

(22) Filed: Sep. 27, 2018

(65) Prior Publication Data

US 2020/0105273 A1    Apr. 2, 2020

(51) Int. Cl.
  *G10L 15/30*  (2013.01)
  *G10L 15/32*  (2013.01)
  *G10L 15/08*  (2006.01)
  *G10L 15/22*  (2006.01)

(52) U.S. Cl.
  CPC ............ *G10L 15/30* (2013.01); *G10L 15/083* (2013.01); *G10L 15/22* (2013.01); *G10L 15/32* (2013.01); *G10L 2015/088* (2013.01)

(58) Field of Classification Search
  CPC ....... G10L 15/30; G10L 15/32; G10L 15/083; G10L 15/22; G10L 2015/088; G10L 15/1822; G10L 2015/223; G06F 3/167
  See application file for complete search history.

(56) References Cited

U.S. PATENT DOCUMENTS

| 6,229,880 | B1  | 5/2001 | Reformato et al. |
| 9,443,527 | B1* | 9/2016 | Watanabe ............... G10L 15/22 |
| 9,633,674 | B2  | 4/2017 | Sinha |

(Continued)

FOREIGN PATENT DOCUMENTS

JP    2017535823 A    11/2017

OTHER PUBLICATIONS

Chen, Brian X., "Siri, Alexa and Other Virtual Assistants Put to the Test", https://www.nytimes.com/2016/01/28/technology/personaltech/siri-alexa-and-other-virtual-assistants-put-to-the-test.html, Jan. 27, 2016, 5 pages.

(Continued)

*Primary Examiner* — Michael N Opsasnick
(74) *Attorney, Agent, or Firm* — Stephen J. Walder, Jr.; Ingrid M. Foerster

(57) ABSTRACT

Mechanisms are provided to implement an intelligent service broker for routing a voice command from a user to one or more virtual assistants based on each virtual assistant's capability to provide an accurate response. Responsive to receiving a voice command with a wake word associated with the intelligent service broker, the intelligent service broker identifies a subject or category of the voice command. Using the identified subject or category, the intelligent service broker selects one or more virtual assistants using a set of ranking values and a set of characteristics that indicate which ranking values to evaluate. The intelligent service broker sends the voice command to the identified virtual assistants and, responsive to receiving responses from more than one virtual assistant, identifies a confidence ranking for each of the responding virtual assistants and provides one or more of the responses based on a set of user configuration settings.

20 Claims, 4 Drawing Sheets

(56) References Cited

U.S. PATENT DOCUMENTS

| | | | | |
|---|---|---|---|---|
| 2011/0225019 A1* | 9/2011 | Taylor | ................ | G06Q 30/0185 |
| | | | | 705/7.28 |
| 2012/0036245 A1* | 2/2012 | Dare | ................... | H04L 41/5041 |
| | | | | 709/223 |
| 2013/0110515 A1* | 5/2013 | Guzzoni | ........... | H04M 1/72547 |
| | | | | 704/270.1 |
| 2014/0022051 A1* | 1/2014 | Levien | ................. | G05D 1/0202 |
| | | | | 340/5.2 |
| 2014/0040748 A1* | 2/2014 | Lemay | ................ | G10L 15/1822 |
| | | | | 715/728 |
| 2014/0297284 A1* | 10/2014 | Gruber | .................... | G10L 15/18 |
| | | | | 704/257 |
| 2016/0070260 A1* | 3/2016 | Levien | .................... | A61M 5/20 |
| | | | | 701/3 |
| 2016/0217790 A1* | 7/2016 | Sharifi | .................... | G10L 17/22 |
| 2016/0308799 A1* | 10/2016 | Schubert | ................. | H04L 51/02 |
| 2016/0365088 A1 | 12/2016 | Liang et al. | | |
| 2017/0076749 A1* | 3/2017 | Kanevsky | ........... | G10L 21/0202 |
| 2017/0093952 A1* | 3/2017 | Kumar | .................... | H04L 67/22 |
| 2017/0133011 A1* | 5/2017 | Chen | ........................ | G10L 15/30 |
| 2017/0242653 A1* | 8/2017 | Lang | ........................ | H04R 3/00 |
| 2017/0289168 A1* | 10/2017 | Bar | ..................... | H04L 63/0853 |
| 2017/0366587 A1* | 12/2017 | Sharifi | ............. | H04N 21/23439 |
| 2018/0025075 A1 | 1/2018 | Beller et al. | | |
| 2018/0040324 A1 | 2/2018 | Wilberding | | |
| 2018/0061419 A1* | 3/2018 | Melendo Casado | .... | G10L 15/30 |
| 2018/0204569 A1* | 7/2018 | Nadkar | ................... | G10L 15/22 |
| 2018/0293484 A1* | 10/2018 | Wang | ..................... | G06F 3/167 |

OTHER PUBLICATIONS

Patel, Idrees, ""Hey Google" Voice Command is Now Widely Rolling-out in Google Assistant", https://www.xda-developers.com/hey-google-voice-command-google-assistant/, Dec. 16, 2017, 7 pages.

\* cited by examiner

ROUTING VOICE COMMANDS TO VIRTUAL ASSISTANTS

BACKGROUND

The present application relates generally to an improved data processing apparatus and method and more specifically to mechanisms for routing a voice command to one or more virtual assistants based on each virtual assistant's capability to provide an accurate answer.

A virtual assistant is a software agent that performs tasks or services for an individual. Virtual assistants are growing in popularity, with the leading players being Apple's Siri®, Google Assistant™, Amazon Alexa™, and Microsoft Cortanai™. Virtual assistants can provide a wide variety of services, such as weather, facts from various Internet resources, alarms, to-do lists, shopping lists, or the like. Virtual assistants also play music from streaming services, play radio stations, read audiobooks, play videos, TV shows, or movies on televisions, stream videos from streaming providers, or the like. Additionally, virtual assistants provide various means of messaging, including voice assistants, live chat on e-commerce Web sites, live chat on messaging apps, and chatbots on messaging apps or Web sites.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to implement an intelligent service broker for routing a voice command from a user to one or more virtual assistants based on each virtual assistant's capability to provide an accurate response. The method comprises identifying, by the intelligent service broker, a wake word associated with the voice command received from the user via a user interface. The method also comprises, responsive to the wake word being associated with the intelligent service broker, identifying, by the intelligent service broker, a subject or category of the voice command. Moreover, the method comprises selecting, by the intelligent service broker, one or more virtual assistants of a subset of virtual assistants using a set of ranking values associated with the subset of virtual assistants and a set of characteristics that indicate which ranking value of the set of ranking values to evaluate based on the identified subject or category. The method comprises sending, by the intelligent service broker, the voice command to the one or more identified virtual assistants. Additionally, the method comprises determining, by the intelligent service broker, whether more than one virtual assistant provided a response to the voice command in response to receiving a response from one or more identified virtual assistants. Further, the method comprises identifying, by the intelligent service broker, a confidence ranking for each of the virtual assistants providing a response in response to more than one virtual assistant providing a response. Finally, the method comprises providing, by the intelligent service broker, one or more of the more than one responses to the user via the user interface based on a set of user configuration settings.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
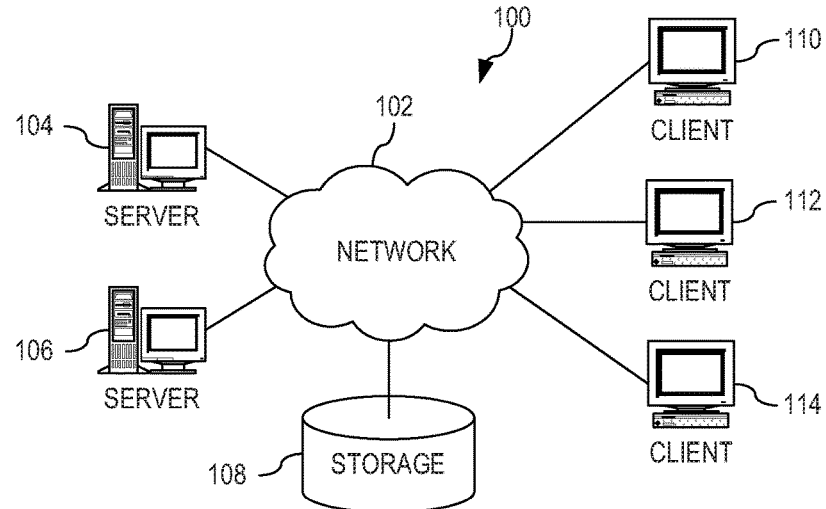
FIG. 1 is an example diagram of a distributed data processing system in which aspects of the illustrative embodiments may be implemented.

As noted previously, a virtual assistant is a software agent that performs tasks or services for an individual. Virtual assistants are growing in popularity, with the leading players being Apple's Siri®, Google Assistant™, Amazon Alexa™, and Microsoft Cortana™. While each virtual assistant provides a wide variety of services, each virtual assistant has its own configuration as well as its own set of limitations. Once a particular virtual assistant is chosen by a user, the user has to deal with a single source of information and, in some cases an inability to upgrade existing hardware, thereby cause the user to scrape an older model for a newer model.

Thus, the illustrative embodiments provide mechanisms that offer users access to a plurality of virtual assistants, such as Apple's Siri®, Google Assistant™, Amazon Alexa™, Microsoft Cortana™, or the like, and route a voice command from the users to one or more virtual assistants based on each virtual assistant's capability to provide an accurate answer. The mechanisms comprise an intelligent service broker that is situated between user interface and the plurality of virtual assistants that the user has configured. The user may still access a specific virtual assistant through the intelligent service broker utilizing the wake word associated with that virtual assistant. Alternatively, the user may utilize a neutral wake word associated with the intelligent service broker and, based on the intelligent service broker's machine-learned capabilities of each of the virtual assistant configured by the user, sends the question/command to an appropriate virtual assistant that is most likely to provide an accurate answer. For example, if the intelligent service broker has been configured with several services, but only Amazon Alexa™ and Apple Siri® know how to lookup population statistics:

If the user says "Alexa: What is the population of Iraq?" the intelligent service broker will forward the question to Amazon™ to answer the question.

If the user says "Siri: What is the population of Iraq?" the intelligent service broker will forward the question to Apple to answer the question.

However, if the user says, for example, "Harry: What is the population of Iraq?" the intelligent service broker will choose a virtual assistant to forward the question to based on the intelligent service broker's machine-learned capabilities of either Apple's Siri® or Amazon Alexa™.

While the intelligent service broker of the illustrative embodiments has access to a plurality of virtual assistants, the user may have access to only a subset of the plurality of virtual assistants based on selected subscriptions, which are then configured into the intelligent service broker. The intelligent service broker then gathers data one or more knowledge bases so as to predict which virtual assistant is most likely to provide a most accurate answer to a given question. Further, over time, the intelligent service broker utilizes machine learning to improve the accuracy of virtual assistant selection so as to routing a voice command to one or more virtual assistants based on each virtual assistant's capability to provide an accurate answer. Thus, the mechanisms of the illustrative embodiment provide both a practical application and technical improvement over technologies found in the marketplace by providing the user with access to a plurality of virtual assistances and routing a voice command to one or more virtual assistants of those configured by the user based on each virtual assistant's capability to provide an accurate answer.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
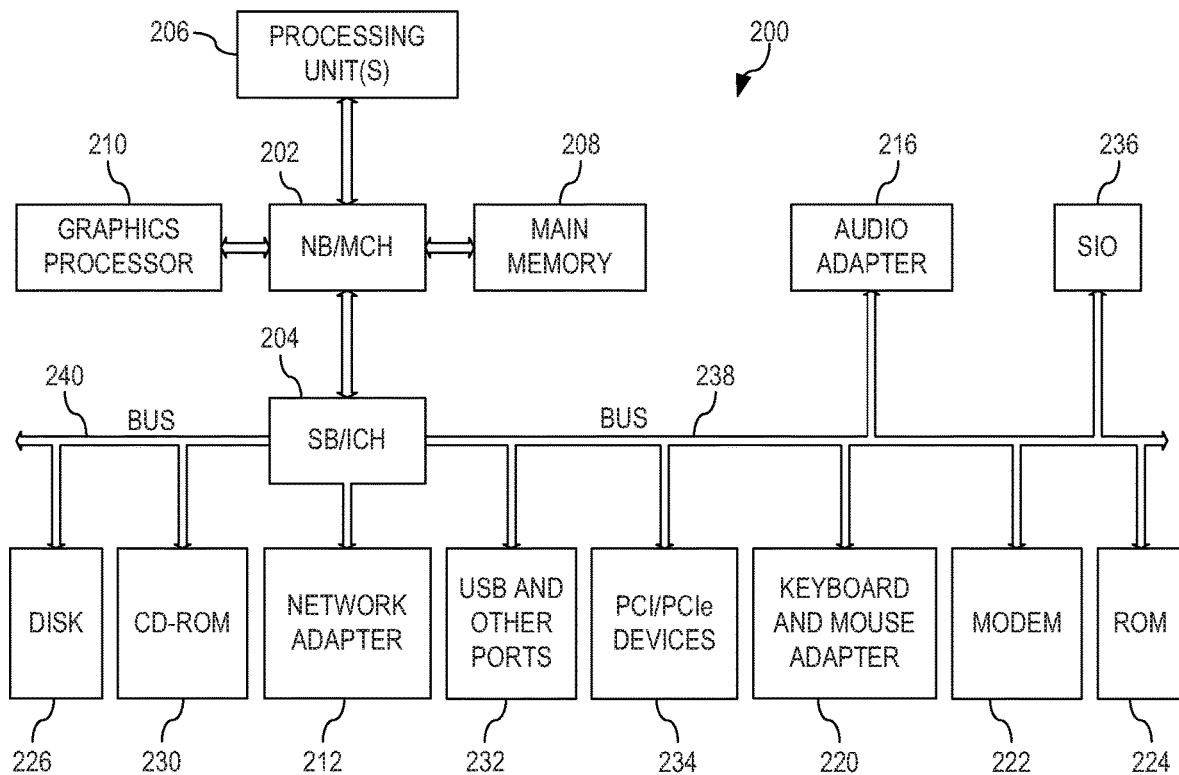
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an intelligent service broker. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates an intelligent service broker that routes a voice command to one or more virtual assistants based on each virtual assistant's capability to provide an accurate answer.

As noted above, the mechanisms of the illustrative embodiments utilize specifically configured computing devices, or data processing systems, to perform the operations for routing a voice command to one or more virtual assistants based on each virtual assistant's capability to provide an accurate answer. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the intelligent service broker routing a voice command to one or more virtual assistants based on each virtual assistant's capability to provide an accurate answer.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
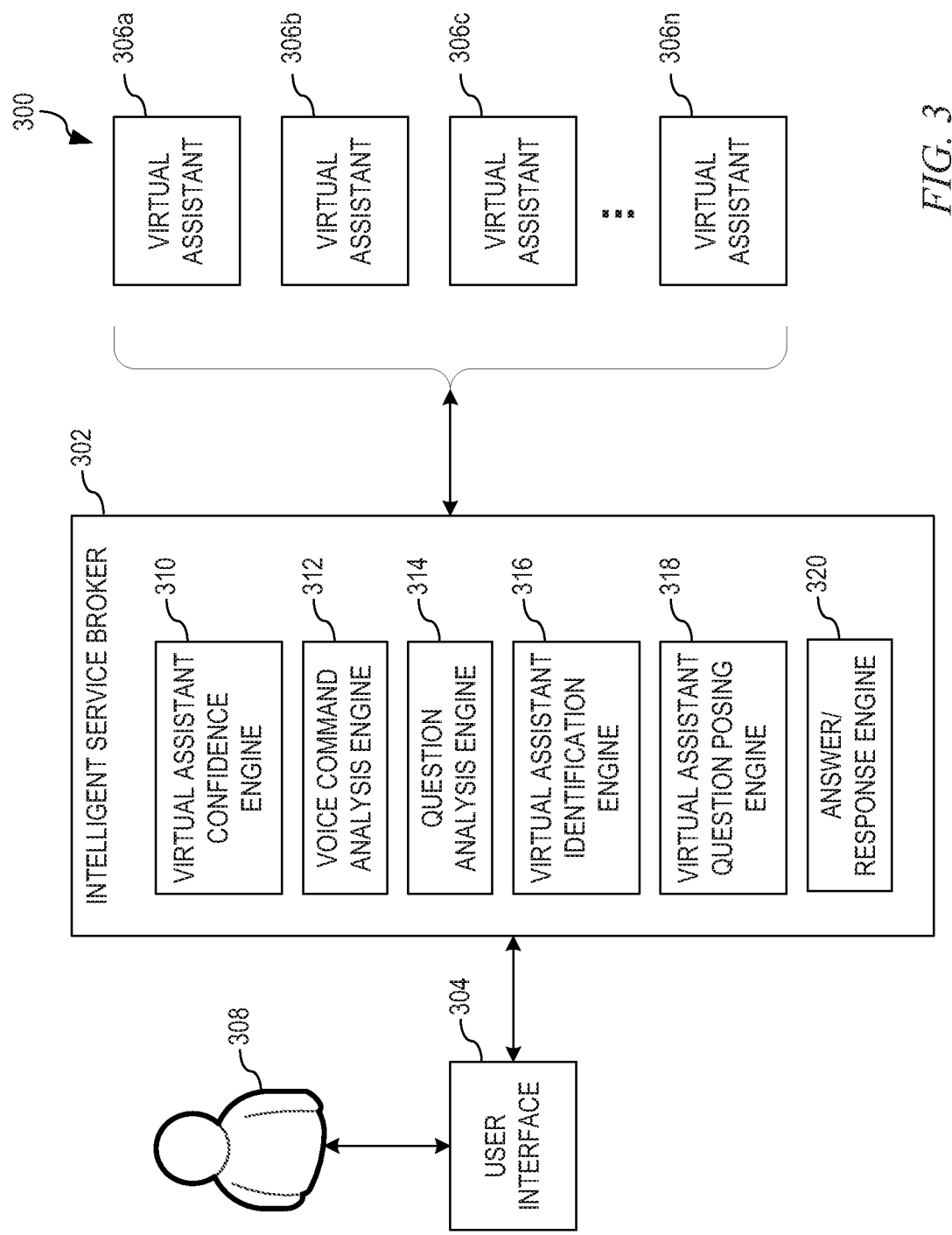
FIG. 3 depicts an exemplary functional block diagram of an intelligent service broker that routes a voice command to one or more virtual assistants based on each virtual assistant's capability to provide an accurate answer in accordance with an illustrative embodiment.

FIG. 3 depicts an exemplary functional block diagram of an intelligent service broker that routes a voice command to one or more virtual assistants based on each virtual assistant's capability to provide an accurate answer in accordance with an illustrative embodiment. Data processing system 300, which is a data processing system such as data processing system 100 of FIG. 1 or data processing system 200 of FIG. 2, comprises intelligent service broker 302 that is situated between user interface 304 and a plurality of virtual assistants 306a-306n. Each virtual assistant in the plurality of virtual assistants 306a-306n may be a virtual assistant such as Apple's Siri®, Google Assistant™, Amazon Alexa™, Microsoft Cortana™, or the like. It is noted that each of the plurality of virtual assistants 306a-306n performs many different functions, such as play music from streaming services, play radio stations, read audiobooks, play videos, TV shows, or movies on televisions, stream videos from streaming providers, or the like. However, the illustrative embodiment are directed to the functions related to question and answer function.

Intelligent service broker 302 provides accessibility to the plurality of virtual assistants 306a-306n; although, user 308 may only access a subset of the plurality of virtual assistants 306a-306n. That is, based on user configuration, subscription, or the like, user 308 may only access, for example, virtual assistants 306a, 306c, and 306f. In accordance with the illustrative embodiments, the user may add or remove virtual assistants from the subset of assistants at any time thereby changing the number of virtual assistants intelligent service broker 302 utilizes to route voice commands based on each virtual assistant's capability to provide an accurate answer.

In order to route a voice command of user 308 received from user interface 304, intelligent service broker 302 comprises virtual assistant confidence engine 310, voice command analysis engine 312, question analysis engine 314, virtual assistant identification engine 316, virtual assistant question posing engine 318, and answer/response engine 320. Initially, virtual assistance confidence engine 310 initializes a set of ranking values for each of the subset of virtual assistants of the plurality of virtual assistants 306a-306n that user 308 has configured, subscribed to, or the like. Each virtual assistant may have one or more ranking values, such as a ranking value for user preference, a ranking value for popularity, a ranking value for subject or category expertise, a ranking value for confidence, or the like. In initializing the ranking value for each of the subset of virtual assistants, virtual assistance confidence engine 310 may initialize the ranking values to zero, virtual assistance confidence engine 310 may access one or more knowledge databases to obtain a ranking value for each of the subset of virtual assistants and utilize the obtained ranking values, virtual assistance confidence engine 310 may initialize the ranking values based on user input from user 308.

With the initial ranking values set for each of the subset of virtual assistants, intelligent service broker 302 is prepared to provide answers to questions posed by user 308. Responsive to receiving a voice command, specifically a command that requests an answer, i.e. a question, from user 308 via user interface 304, voice command analysis engine 312 determines the wake word associated with the voice command. Voice command analysis engine 312 analyzes the command to determine whether the wake word is associated with a specific one of the subset of virtual assistants or a neutral wake word associated with intelligent service broker 302. If voice command analysis engine 312 determines that the wake word is associated with a specific one of the subset of virtual assistants, then virtual assistant question posing engine 318 sends the question to the virtual assistant associated with the specific wake word.

If voice command analysis engine 312 determines that the wake word is associated with intelligent service broker 302, question analysis engine 314 determines the subject or category of the voice command, such as geography, history, economics, music, or the like. Based on the identified subject or category, virtual assistant identification engine 316 selects one or more virtual assistants of the subset of virtual assistants using the associated set of ranking values and a set of characteristics that indicates which ranking value of the set of ranking values to evaluate. That is, in one embodiment and for some types of question, the user may have configured intelligent service broker 302 to utilize user preference ranking values. In another illustrative embodiment and for other types of questions, the user may have configured intelligent service broker 302 to utilize subject or category expertise ranking values. Regardless of the ranking values that are utilized to identify the one or more virtual assistants, once virtual assistant identification engine 316 has identified the one or more virtual assistants that the voice command is to be issued to, virtual assistant question posing engine 318 sends the question to the one or more identified virtual assistants.

Responsive to an answer is received from one or more virtual assistants, answer/response engine 320 determines whether more than one virtual assistant provided an answer to the question. If answer/response engine 320 determines that only one virtual assistant responded, as would be the case in virtual assistant question posing engine 318 sending the question to the virtual assistant associated with the specific wake word or virtual assistant question posing engine 318 sends the question to a specific virtual assistant identified by virtual assistant identification engine 316, answer/response engine 320 sends the response to user 308 via user interface 304. However, if answer/response engine 320 determines that answers were received by more than one virtual assistant, then answer/response engine 320 communicates with virtual assistant identification engine 316 to identify a confidence ranking for each of the virtual assistants that provided an answer, the confidence ranking based on user interactions with the subset of virtual assistants.

With a confidence ranking identified, in accordance with one embodiment, answer/response engine 320 may utilize user configuration setting to provide all the received answers along with the confidence rankings to user 308 via user interface 304. However, if the user configuration settings indicate that even though more than one virtual assistant provided an answer, only the answer of the highest confidence virtual assistant should be provided, then answer/response engine 320 provides only the answer from the virtual assistant with the highest confidence rank to user 308 via user interface 304.

Responsive to the answer being provided to user 308, user 308 may provide feedback to intelligent service broker 302 that is used by intelligent service broker 302 through a supervised machine-learning process to improve routing a voice command to one or more virtual assistants based on each virtual assistant's capability to provide an accurate answer. For example, if user 308 doesn't like the answer provided a particular virtual assistant, user 308 may provide voice command such as, for example, "try another" to indicate that user 308 wants to hear an answer from another virtual assistant. When user 308 provides such a virtual command, virtual assistant confidence engine 310 uses this information to indicate that the virtual assistant failed to supply a correct answer and adjusts the one or more ranking values of the set of ranking values associated with the virtual assistant, i.e. reduce the confidence ranking of the virtual assistant. Conversely, when user 308 does not ask for another answer or provides a voice command such as, for example, "good job", virtual assistant confidence engine 310 may consider no follow-up command or the positive voice command as an indication that the answer was good. Thus, virtual assistant confidence engine 310 adjusts the one or more ranking values of the set of ranking values associated with the virtual assistant, i.e. increase the confidence ranking of the virtual assistant.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
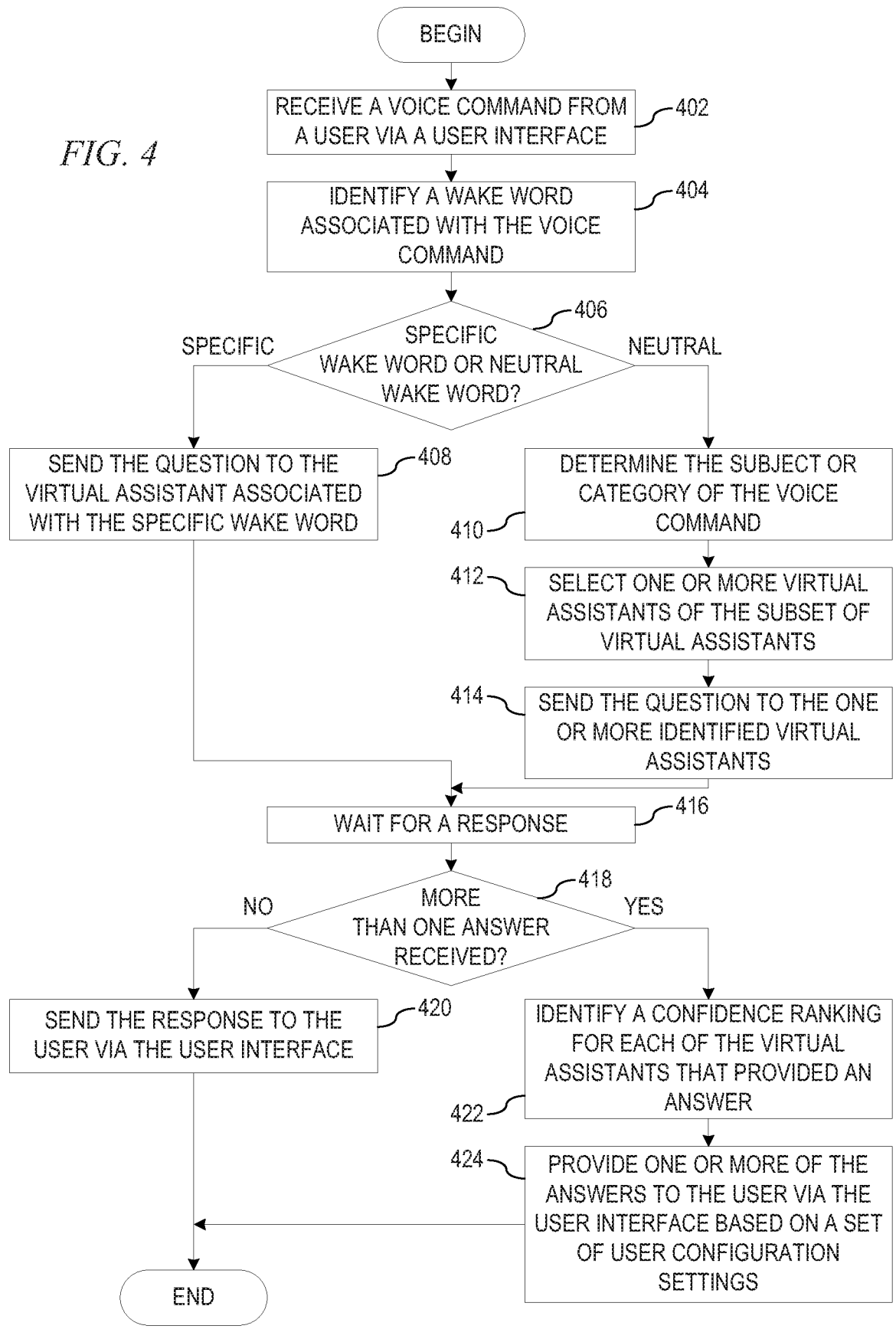
FIG. 4 depicts an exemplary flowchart of the operation performed by an intelligent service broker in routing a voice command to one or more virtual assistants based on each virtual assistant's capability to provide an accurate answer in accordance with an illustrative embodiment.

FIG. 4 depicts an exemplary flowchart of the operation performed by an intelligent service broker in routing a voice command to one or more virtual assistants based on each virtual assistant's capability to provide an accurate answer in accordance with an illustrative embodiment. As the operation begins, the intelligent service broker receives a voice command, specifically a command that requests an answer, i.e. a question, from a user via a user interface (step 402). The intelligent service broker identifies a wake word associated with the voice command (step 404) determines whether the wake word is associated with the specific virtual assistant of the subset of virtual assistants or a neutral wake word associated with intelligent service broker (step 406). If at step 406 the intelligent service broker determines that the wake word is associated with a specific one of the subset of virtual assistants, then the intelligent service broker sends the question to the virtual assistant associated with the specific wake word (step 408).

If at step 406 the intelligent service broker determines that the wake word is associated with the intelligent service broker, the intelligent service broker determines the subject or category of the voice command, such as geography, history, economics, music, or the like (step 410). Based on the identified subject or category, the intelligent service broker selects one or more virtual assistants of the subset of virtual assistants using the associated set of ranking values and a set of characteristics that indicates which ranking value of the set of ranking values to evaluate (step 412). Once the intelligent service broker has identified the one or more virtual assistants that the voice command is to be issued to, the intelligent service broker sends the question to the one or more identified virtual assistants (step 414).

From step 408 or from step 414, the intelligent service broker waits for a response from the one or more virtual assistants that the question was sent to (step 416). Responsive to an answer be received from one or more virtual assistants, the intelligent service broker determines whether more than one virtual assistant provided an answer to the question (step 418). If at step 418 the intelligent service broker determines that only one virtual assistant responded, as would be the case in the intelligent service broker sending the question to the virtual assistant associated with the specific wake word or the intelligent service broker sending the question to a specific virtual assistant, the intelligent service broker sends the response to the user via the user interface (step 420), with the operation ending thereafter. If at step 418 the intelligent service broker determines that answers were received by more than one virtual assistant, then the intelligent service broker identifies a confidence ranking for each of the virtual assistants that provided an answer (step 422), the confidence ranking based on user interactions with the subset of virtual assistants. With a confidence ranking identified, the intelligent service broker provides one or more of the answers to the user via the user interface based on a set of user configuration settings (step 424), with the operation ending thereafter.

Figure 5:
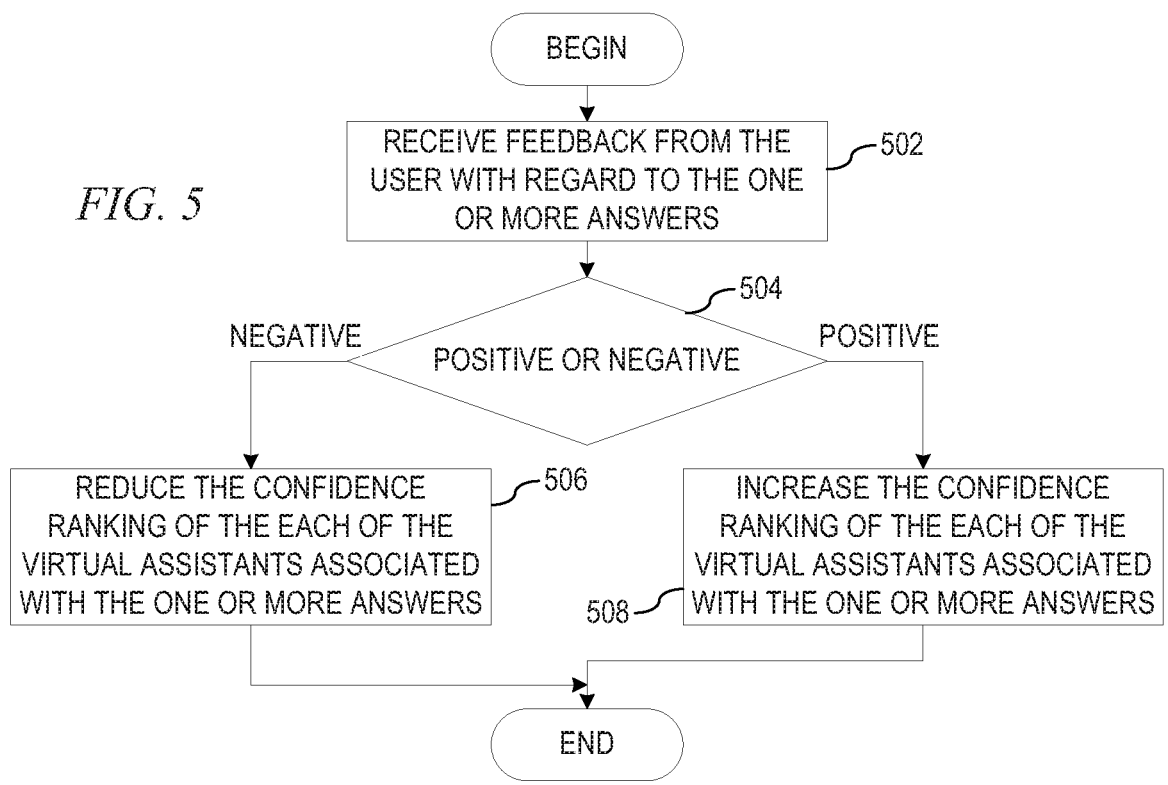
FIG. 5 depicts an exemplary flowchart of the operation performed by an intelligent service broker in improving the routing of a voice command to one or more virtual assistants based on each virtual assistant's capability to provide an accurate answer in accordance with an illustrative embodiment.

FIG. 5 depicts an exemplary flowchart of the operation performed by an intelligent service broker in improving the routing of a voice command to one or more virtual assistants based on each virtual assistant's capability to provide an accurate answer in accordance with an illustrative embodiment. As the operation begins, responsive to one or more answers being provided to a user via a user interface, the intelligent service broker receives feedback from the user with regard to the one or more answers (step 502). The intelligent service broker determines, for each answer, whether the feedback from the user is positive or negative (step 504). If at step 504 the intelligent service broker identifies that the feedback is negative thereby indicating that the virtual assistant failed to supply a correct answer, the intelligent service broker adjusts the one or more ranking values of the set of ranking values associated with the virtual assistant (step 506), i.e. reduce the confidence ranking of the virtual assistant, with the operation ending thereafter. Conversely, if at step 504 the intelligent service broker identifies that the feedback is positive thereby indicating that the virtual assistant supplied a correct answer, the intelligent service broker adjusts the one or more ranking values of the set of ranking values associated with the virtual assistant (step 508), i.e. increase the confidence ranking of the virtual assistant, with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms, i.e. an intelligent service broker, for routing a voice command from the users to one or more virtual assistants based on each virtual assistant's capability to provide an accurate answer. Utilizing wake word associated with a specific virtual assistant or a neutral wake word associated with the intelligent service broker, the intelligent service broker utilizes machine-learned capabilities of each of the virtual assistant configured by the user to send the question associated with the voice command to an appropriate virtual assistant that is most likely to provide an accurate answer. That is, the intelligent service broker then gathers data one or more knowledge bases so as to predict which virtual assistant is most likely to provide a most accurate answer to a given question. Further, over time, the intelligent service broker utilizes machine learning to improve the accuracy of virtual assistant selection so as to routing a voice command to one or more virtual assistants based on each virtual assistant's capability to provide an accurate answer. Thus, the mechanisms of the illustrative embodiment provide both a practical application and technical improvement over technologies found in the marketplace by providing the user with access to a plurality of virtual assistances and routing a voice command to one or more virtual assistants of those configured by the user based on each virtual assistant's capability to provide an accurate answer.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to cause the at least one processor to be configured to implement an intelligent service broker for routing a voice command from a user to one or more virtual assistants of a plurality of virtual assistants, based on each virtual assistant's capability to provide an accurate response, the method comprising:

receiving the voice command at the intelligent service broker;

prior to sending, from the intelligent service broker, the voice command to one or more virtual assistants in the plurality of virtual assistants:

determining, by the intelligent service broker, a subject or category of the voice command;

determining, by the intelligent service broker, one or more ranking value types to evaluate based on the determined subject or category, wherein each virtual assistant in the plurality of virtual assistants has a set of ranking values, each ranking value in the set of ranking values having a different ranking value type, and wherein the determination determines one or more ranking value types of the set of ranking value types; and selecting, by the intelligent service broker, the one or more virtual assistants from the plurality of virtual assistants based on results of evaluating the one or more ranking values, of the plurality of virtual assistants, having the determined one or more ranking value types;
sending, by the intelligent service broker, the voice command to the selected one or more virtual assistants;
responsive to receiving a response from the selected one or more virtual assistants, determining, by the intelligent service broker, whether more than one virtual assistant provided a response to the voice command;
responsive to more than one virtual assistant providing a response, identifying, by the intelligent service broker, a confidence ranking for each of the virtual assistants providing a response; and
providing, by the intelligent service broker, at least one response of the more than one responses to the user via a user interface based on a set of user configuration settings.

2. The method of claim 1, further comprising:
identifying, by the intelligent service broker, a wake word for the intelligent service broker associated with the received voice command; and
responsive to the wake word being a neutral wake word for invoking intelligent service broker machine learning functions, executing the intelligent service broker machine learning functions to select the one or more virtual assistants.

3. The method of claim 1, wherein providing the at least one response to the user via the user interface comprises:
providing, by the intelligent service broker, all of the more than one responses to the user along with a confidence ranking associated with the virtual assistant providing the response.

4. The method of claim 1, wherein providing the at least one response to the user via the user interface comprises:
providing, by the intelligent service broker, only a response from a virtual assistant with a highest confidence ranking of the confidence rankings of each of the virtual assistants providing a response.

5. The method of claim 1, wherein the intelligent service broker initially sets the set of ranking values for each virtual assistant in the selected one or more virtual assistants based on a prediction, for each virtual assistant, of an accuracy of the virtual assistant based on data obtained from one or more knowledge databases, and wherein the setting of the ranking values for the virtual assistant are dynamically updated based on user input, or a lack of user input, in response to answers being generated by the virtual assistant.

6. The method of claim 1, wherein the intelligent service broker initially sets the set of ranking values for each virtual assistant in the selected one or more virtual assistants based on user input, and wherein the setting of the ranking values for the virtual assistant are dynamically updated based on user input, or a lack of user input, in response to answers being generated by the virtual assistant.

7. The method of claim 1, wherein the intelligent service broker initially sets the set of ranking values for each virtual assistant in the selected one or more virtual assistants to zero, and wherein the setting of the ranking values for the virtual assistant are dynamically updated based on user input, or a lack of user input, in response to answers being generated by the virtual assistant.

8. The method of claim 1, further comprising:
receiving, by the intelligent service broker, feedback from the user in response to providing the at least one response to the user; and
responsive to the user feedback being negative, thereby indicating that the virtual assistant failed to supply a correct response, reducing, by the intelligent service broker, one or more ranking values of the set of ranking values associated with the virtual assistant.

9. The method of claim 1, further comprising:
receiving, by the intelligent service broker, feedback from the user in response to providing the at least one response to the user; and
responsive to the user feedback being positive, hereby indicating that the virtual assistant supplied a correct response, increasing, by the intelligent service broker, one or more ranking values of the set of ranking values associated with the virtual assistant.

10. The method of claim 1, wherein the set of ranking values for each virtual assistant comprises a ranking value for user preference, a ranking value for popularity, a ranking value for subject or category expertise, and a ranking value for confidence.

11. A computer program product comprising a computer readable storage medium having a computer readable program stored therein, wherein the computer readable program, when executed on a data processing system, causes the data processing system to implement an intelligent service broker for routing a voice command from a user to one or more virtual assistants of a plurality of virtual assistants, based on each virtual assistant's capability to provide an accurate response, and further causes the data processing system to:
receive the voice command at the intelligent service broker;
prior to sending, from the intelligent service broker, the voice command to one or more virtual assistants in the plurality of virtual assistants:
determining, by the intelligent service broker, a subject or category of the voice command;
determining, by the intelligent service broker, one or more ranking value types to evaluate based on the determined subject or category, wherein each virtual assistant in the plurality of virtual assistants has a set of ranking values, each ranking value in the set of ranking values having a different ranking value type, and wherein the determination determines one or more ranking value types of the set of ranking value types; and
selecting, by the intelligent service broker, the one or more virtual assistants from the plurality of virtual assistants based on results of evaluating the one or more ranking values, of the plurality of virtual assistants, having the determined one or more ranking value types;
send, by the intelligent service broker, the voice command to the selected one or more virtual assistants;
responsive to receiving a response from the selected one or more virtual assistants, determine, by the intelligent service broker, whether more than one virtual assistant provided a response to the voice command;
responsive to more than one virtual assistant providing a response, identify, by the intelligent service broker, a confidence ranking for each of the virtual assistants providing a response; and
provide, by the intelligent service broker, at least one response of the more than one responses to the user via a user interface based on a set of user configuration settings.

12. The computer program product of claim 11, wherein the computer readable program further causes the data processing system to:

identify, by the intelligent service broker, a wake word for the intelligent service broker associated with the received voice command; and execute, responsive to the wake word being a neutral wake word for invoking intelligent service broker machine learning functions, the intelligent service broker machine learning functions to select the one or more virtual assistants.

13. The computer program product of claim 11, wherein the computer readable program further causes the data processing system to provide the at least one response to the user via the user interface at least by:

providing, by the intelligent service broker, all of the more than one responses to the user along with a confidence ranking associated with the virtual assistant providing the response.

14. The computer program product of claim 11, wherein the computer readable program further causes the data processing system to provide the at least one response to the user via the user interface at least by:

providing, by the intelligent service broker, only a response from a virtual assistant with a highest confidence ranking of the confidence rankings of each of the virtual assistants providing a response.

15. The computer program product of claim 11, wherein the computer readable program further causes the data processing system to:

receive, by the intelligent service broker, feedback from the user in response to providing the at least one response to the user;

responsive to the user feedback being negative, thereby indicating that the virtual assistant failed to supply a correct response, reduce, by the intelligent service broker, one or more ranking values of the set of ranking values associated with the virtual assistant; and responsive to the user feedback being positive, thereby indicating that the virtual assistant supplied a correct response, increase, by the intelligent service broker, one or more ranking values of the set of ranking values associated with the virtual assistant.

16. A data processing system comprising:

at least one processor; and at least one memory coupled to the at least one processor, wherein the at least one memory comprises instructions which, when executed by the at least one processor, cause the at least one processor to implement an intelligent service broker for routing a voice command from a user to one or more virtual assistants of a plurality of virtual assistants, based on each virtual assistant's capability to provide an accurate response, and further cause the at least one processor to:

receive the voice command at the intelligent service broker;

prior to sending, from the intelligent service broker, the voice command to one or more virtual assistants in the plurality of virtual assistants:

determining, by the intelligent service broker, a subject or category of the voice command;

determining, by the intelligent service broker, one or more ranking value types to evaluate based on the determined subject or category, wherein each virtual assistant in the plurality of virtual assistants has a set of ranking values, each ranking value in the set of ranking values having a different ranking value type, and wherein the determination determines one or more ranking value types of the set of ranking value types; and selecting, by the intelligent service broker, the one or more virtual assistants from the plurality of virtual assistants based on results of evaluating the one or more ranking values, of the plurality of virtual assistants, having the determined one or more ranking value types;

send, by the intelligent service broker, the voice command to the selected one or more virtual assistants;

responsive to receiving a response from the selected one or more virtual assistants, determine, by the intelligent service broker, whether more than one virtual assistant provided a response to the voice command;

responsive to more than one virtual assistant providing a response, identify, by the intelligent service broker, a confidence ranking for each of the virtual assistants providing a response; and provide, by the intelligent service broker, at least one response of the more than one responses to the user via a user interface based on a set of user configuration settings.

17. The data processing system of claim 16, wherein the instructions further cause the at least one processor to:

identify, by the intelligent service broker, a wake word for the intelligent service broker associated with the received voice command; and execute, responsive to the wake word being a neutral wake word for invoking intelligent service broker machine learning functions, the intelligent service broker machine learning functions to select the one or more virtual assistants.

18. The data processing system of claim 16, wherein the instructions to provide the at least one response to the user via the user interface based on the set of user configuration settings further cause the at least one processor to:

provide, by the intelligent service broker, all of the more than one responses to the user along with a confidence ranking associated with the virtual assistant providing the response.

19. The data processing system of claim 16, the instructions to provide the at least one response to the user via the user interface based on the set of user configuration settings further cause the at least one processor to:

provide, by the intelligent service broker, only a response from a virtual assistant with a highest confidence ranking of the confidence rankings of each of the virtual assistants providing a response.

20. The data processing system of claim 16, wherein the instructions further cause the at least one processor to:

receive, by the intelligent service broker, feedback from the user in response to providing the at least one response to the user;

responsive to the user feedback being negative thereby indicating that the virtual assistant failed to supply a correct response, reduce, by the intelligent service broker, one or more ranking values of the set of ranking values associated with the virtual assistant; and responsive to the user feedback being positive thereby indicating that the virtual assistant supplied a correct response, increase, by the intelligent service broker, one or more ranking values of the set of ranking values associated with the virtual assistant.

\* \* \* \* \*